(12) United States Patent
Shalizi et al.

(10) Patent No.: US 9,712,313 B2
(45) Date of Patent: Jul. 18, 2017

(54) SYSTEMS FOR MULTI-PEAK-FILTER-BASED ANALOG SELF-INTERFERENCE CANCELLATION

(71) Applicant: Kumu Networks, Inc., Sunnyvale, CA (US)

(72) Inventors: Joseph Shalizi, Sunnyvale, CA (US); Mayank Jain, Sunnyvale, CA (US); Jung-Il Choi, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 125 days.

(21) Appl. No.: 14/931,669

(22) Filed: Nov. 3, 2015

(65) Prior Publication Data

US 2016/0127112 A1     May 5, 2016

Related U.S. Application Data

(60) Provisional application No. 62/074,512, filed on Nov. 3, 2014.

(51) Int. Cl.
| | | |
|---|---|---|
| *H04L 5/14* | (2006.01) | |
| *H03F 3/19* | (2006.01) | |
| *H03F 3/21* | (2006.01) | |
| *H04B 1/525* | (2015.01) | |

(52) U.S. Cl.
CPC .............. *H04L 5/14* (2013.01); *H04B 1/525* (2013.01)

(58) Field of Classification Search
CPC .................................. H04B 1/525; H04L 5/14
See application file for complete search history.

(56) References Cited

U.S. PATENT DOCUMENTS

| | | |
|---|---|---|
| 3,922,617 A | 11/1975 | Denniston et al. |
| 4,321,624 A | 3/1982 | Gibson et al. |
| 4,952,193 A | 8/1990 | Talwar |
| 5,212,827 A | 5/1993 | Meszko et al. |
| 5,691,978 A | 11/1997 | Kenworthy |
| 5,734,967 A | 3/1998 | Kotzin et al. |
| 5,790,658 A | 8/1998 | Yip et al. |
| 5,818,385 A | 10/1998 | Bartholomew |

(Continued)

FOREIGN PATENT DOCUMENTS

| | | |
|---|---|---|
| EP | 0755141 B1 | 10/2005 |
| EP | 1959625 B1 | 2/2009 |

(Continued)

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.

(Continued)

*Primary Examiner* — Brian D Nguyen
(74) *Attorney, Agent, or Firm* — Jeffrey Schox; Thomas Gwinn

(57) ABSTRACT

A system for multi-peak filter-based analog self-interference cancellation includes a transmit coupler that samples the analog transmit signal to create a sampled analog transmit signal; an analog self-interference canceller, using multi-peak filters, that generates an analog self-interference cancellation signal; and a receive coupler that combines the analog self-interference cancellation signal with the analog receive signal.

23 Claims, 10 Drawing Sheets

(56) References Cited

U.S. PATENT DOCUMENTS

| | | |
|---|---|---|
| 5,930,301 A | 7/1999 | Chester et al. |
| 6,215,812 B1 | 4/2001 | Young et al. |
| 6,240,150 B1 | 5/2001 | Darveau et al. |
| 6,411,250 B1 | 6/2002 | Oswald et al. |
| 6,539,204 B1 | 3/2003 | Marsh et al. |
| 6,567,649 B2 | 5/2003 | Souissi |
| 6,639,551 B2 | 10/2003 | Li et al. |
| 6,657,950 B1 | 12/2003 | Jones et al. |
| 6,725,017 B2 | 4/2004 | Blount et al. |
| 6,965,657 B1 | 11/2005 | Rezvani et al. |
| 7,336,940 B2 | 2/2008 | Smithson |
| 7,349,505 B2 | 3/2008 | Blount et al. |
| 7,362,257 B2 | 4/2008 | Bruzzone et al. |
| 7,426,242 B2 | 9/2008 | Thesling |
| 7,509,100 B2 | 3/2009 | Toncich |
| 7,778,611 B2 | 8/2010 | Asai et al. |
| 7,869,527 B2 | 1/2011 | Vetter et al. |
| 8,005,235 B2 | 8/2011 | Rebandt, II et al. |
| 8,027,642 B2 | 9/2011 | Proctor et al. |
| 8,055,235 B1 | 11/2011 | Gupta et al. |
| 8,060,803 B2 | 11/2011 | Kim |
| 8,086,191 B2 | 12/2011 | Fukuda et al. |
| 8,155,595 B2 | 4/2012 | Sahin et al. |
| 8,175,535 B2 | 5/2012 | Mu |
| 8,179,990 B2 | 5/2012 | Orlik et al. |
| 8,218,697 B2 | 7/2012 | Guess et al. |
| 8,331,477 B2 | 12/2012 | Huang et al. |
| 8,351,533 B2 | 1/2013 | Shrivastava et al. |
| 8,385,871 B2 | 2/2013 | Wyville |
| 8,422,540 B1 | 4/2013 | Negus et al. |
| 8,755,756 B1 | 6/2014 | Zhang et al. |
| 8,842,584 B2 | 9/2014 | Jana et al. |
| 8,995,410 B2 | 3/2015 | Balan et al. |
| 9,019,849 B2 | 4/2015 | Hui et al. |
| 9,042,838 B2 | 5/2015 | Braithwaite |
| 9,054,795 B2 | 6/2015 | Choi et al. |
| 9,077,421 B1 | 7/2015 | Mehlman et al. |
| 9,124,475 B2 | 9/2015 | Li et al. |
| 9,136,883 B1 | 9/2015 | Moher et al. |
| 9,184,902 B2 | 11/2015 | Khojastepour et al. |
| 9,231,647 B2 | 1/2016 | Polydoros et al. |
| 9,312,895 B1 | 4/2016 | Gupta et al. |
| 2002/0034191 A1 | 3/2002 | Shattil |
| 2002/0064245 A1 | 5/2002 | McCorkle |
| 2002/0154717 A1 | 10/2002 | Shima et al. |
| 2002/0172265 A1 | 11/2002 | Kenney |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0148748 A1 | 8/2003 | Shah |
| 2004/0106381 A1 | 6/2004 | Tiller |
| 2004/0266378 A1 | 12/2004 | Fukamachi et al. |
| 2005/0078743 A1 | 4/2005 | Shohara |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0058022 A1 | 3/2006 | Webster et al. |
| 2006/0083297 A1 | 4/2006 | Yan et al. |
| 2006/0209754 A1 | 9/2006 | Ji et al. |
| 2006/0273853 A1 | 12/2006 | Suzuki et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0249314 A1 | 10/2007 | Sanders et al. |
| 2007/0274372 A1 | 11/2007 | Asai et al. |
| 2008/0037801 A1 | 2/2008 | Alves et al. |
| 2008/0089397 A1 | 4/2008 | Vetter et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0180404 A1 | 7/2009 | Jung et al. |
| 2009/0186582 A1 | 7/2009 | Muhammad et al. |
| 2009/0221231 A1 | 9/2009 | Weng et al. |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Yeh et al. |
| 2010/0117693 A1 | 5/2010 | Lorg et al. |
| 2010/0136900 A1 | 6/2010 | Seki |
| 2010/0150033 A1 | 6/2010 | Zinser et al. |
| 2010/0150070 A1 | 6/2010 | Park et al. |
| 2010/0159858 A1 | 6/2010 | Dent et al. |
| 2010/0215124 A1 | 8/2010 | Zeong et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0026509 A1 | 2/2011 | Tanaka |
| 2011/0081880 A1 | 4/2011 | Ahn |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0243202 A1 | 10/2011 | Lakkis |
| 2011/0250858 A1 | 10/2011 | Jain et al. |
| 2011/0254639 A1 | 10/2011 | Tsutsumi et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0044791 A1 | 2/2013 | Rimini et al. |
| 2013/0089009 A1 | 4/2013 | Li et al. |
| 2013/0102254 A1 | 4/2013 | Cyzs et al. |
| 2013/0114468 A1 | 5/2013 | Hui et al. |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0259343 A1 | 10/2013 | Liu et al. |
| 2013/0301487 A1 | 11/2013 | Khandani |
| 2013/0301488 A1 | 11/2013 | Hong et al. |
| 2013/0308717 A1 | 11/2013 | Maltsev et al. |
| 2014/0011461 A1 | 1/2014 | Bakalski et al. |
| 2014/0126437 A1 | 5/2014 | Patil et al. |
| 2014/0169236 A1 | 6/2014 | Choi et al. |
| 2014/0185533 A1 | 7/2014 | Haub |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0313946 A1 | 10/2014 | Azadet |
| 2014/0348018 A1 | 11/2014 | Bharadia et al. |
| 2014/0348032 A1 | 11/2014 | Hua et al. |
| 2014/0376416 A1 | 12/2014 | Choi |

(56) References Cited

U.S. PATENT DOCUMENTS

| | | | |
|---|---|---|---|
| 2015/0055568 A1* | 2/2015 | Jindal | H04L 5/0048 370/329 |
| 2015/0156003 A1 | 6/2015 | Khandani | |
| 2015/0156004 A1 | 6/2015 | Khandani | |
| 2015/0200721 A1* | 7/2015 | Hwang | H04B 7/0877 455/63.1 |
| 2015/0215937 A1 | 7/2015 | Khandani | |
| 2015/0249444 A1 | 9/2015 | Shin et al. | |
| 2015/0296413 A1* | 10/2015 | Sadek | H04B 1/1027 375/348 |
| 2015/0303984 A1 | 10/2015 | Braithwaite | |
| 2015/0378017 A1* | 12/2015 | Ferguson | G01S 13/882 342/120 |
| 2016/0056946 A1* | 2/2016 | Moher | H04B 15/00 370/277 |
| 2016/0094332 A1* | 3/2016 | Griffiths | H04B 1/109 370/278 |
| 2016/0218769 A1 | 7/2016 | Chang et al. | |

FOREIGN PATENT DOCUMENTS

| | | |
|---|---|---|
| EP | 2237434 A1 | 10/2010 |
| EP | 2267946 A2 | 12/2010 |
| RU | 2256985 C2 | 7/2005 |
| WO | 2013173250 A1 | 11/2013 |
| WO | 2013185106 A1 | 12/2013 |
| WO | 2014093916 A1 | 6/2014 |

OTHER PUBLICATIONS

McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

\* cited by examiner

SYSTEMS FOR MULTI-PEAK-FILTER-BASED ANALOG SELF-INTERFERENCE CANCELLATION

CROSS-REFERENCE TO RELATED APPLICATIONS

This application claims the benefit of U.S. Provisional Application Ser. No. 62/074,512, filed on 3 Nov. 2014, which is incorporated in its entirety by this reference.

TECHNICAL FIELD

This invention relates generally to the wireless communications field, and more specifically to new and useful systems for multi-peak-filter-based analog self-interference cancellation.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, many of the solutions intended to address self-interference are non-ideal; specifically, many self-interference cancellation solutions require a large number of self-interference signal components to generate effective self-interference cancellation signals, and thus require a large number of signal taps, increasing cancellation circuit cost, size, and complexity. Many of these same solutions also make use of delay circuits capable of generating long time delays, which also increase circuit cost, size, and complexity. Thus, there is a need in the wireless communications field to create new and useful systems for multi-peak-filter-based analog self-interference cancellation. This invention provides such new and useful systems.

DESCRIPTION OF THE PREFERRED EMBODIMENTS

Figure 1:
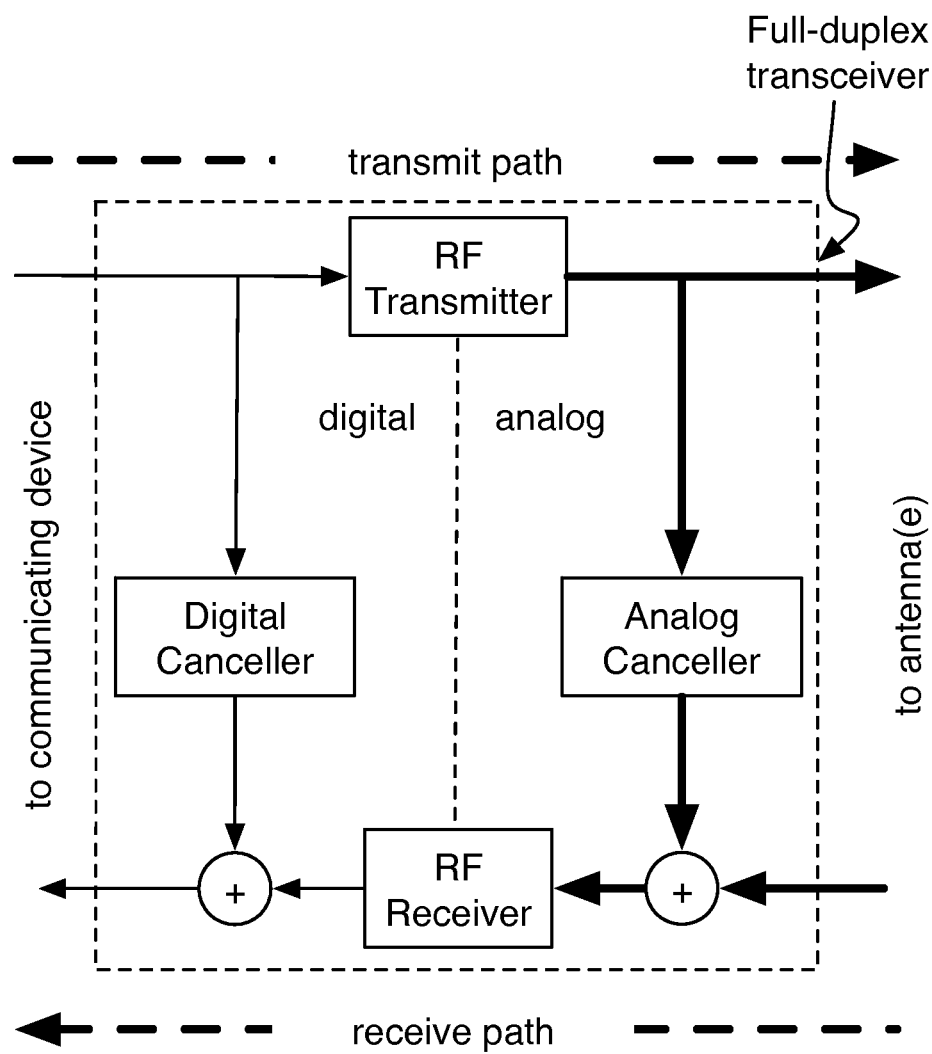
FIG. 1 is a schematic representation of a full-duplex transceiver.

The following description of the preferred embodiments of the invention is not intended to limit the invention to these preferred embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals, intermediate frequency (IF) analog signals, or as radio-frequency (RF) analog signals, but full-duplex transceivers may additionally or alternatively sample transmission output in any suitable manner (e.g., as IF digital signals). This sampled transmission output may be used by full-duplex transceivers to remove interference from received wireless communications data (e.g., as RF/IF analog signals or baseband digital signals). In many full-duplex transceivers, an analog self-interference cancellation system is paired with a digital self-interference cancellation system. The analog self-interference cancellation system removes a first portion of self-interference by summing delayed, phase shifted and scaled versions of the RF transmit signal to create an RF self-interference cancellation signal, which is then subtracted from the RF receive signal. Alternatively, the analog cancellation system may perform similar tasks at an intermediate frequency. After the RF (or IF) receive signal has the RF/IF self-interference cancellation signal subtracted, it passes through an analog-to-digital converter of the receiver (and becomes a digital receive signal). After this stage, a digital self-interference cancellation signal (created by transforming a digital transmit signal) is then subtracted from the digital receive signal.

The systems described herein may increase performance of full-duplex transceivers as shown in FIG. 1 (and other applicable systems) by enabling highly effective analog self-interference cancellation while reducing self-interference cancellation circuit complexity and/or cost. This reduction may be enabled by the use of multi-peak filters in the analog self-interference cancellation circuit, which may both allow a reduction in the number of signal components necessary to generate an effective self-interference cancellation signal (by enabling the formation of an efficient basis set of signal components) and a reduction in the number of delays (or delay length) used in the circuit (by designing the multi-peak filters to have inherent delay).

In addition to full-duplex wireless communication systems, applicable systems include active sensing systems (e.g., RADAR), wired communications systems, wireless communications systems, channel emulators, reflectometers, PIM analyzers and/or any other suitable system, including communication systems where transmit and receive bands are close in frequency, but not overlapping.

2. System for Multi-Peak-Filter-Based Analog Self-Interference Cancellation

Figure 2:
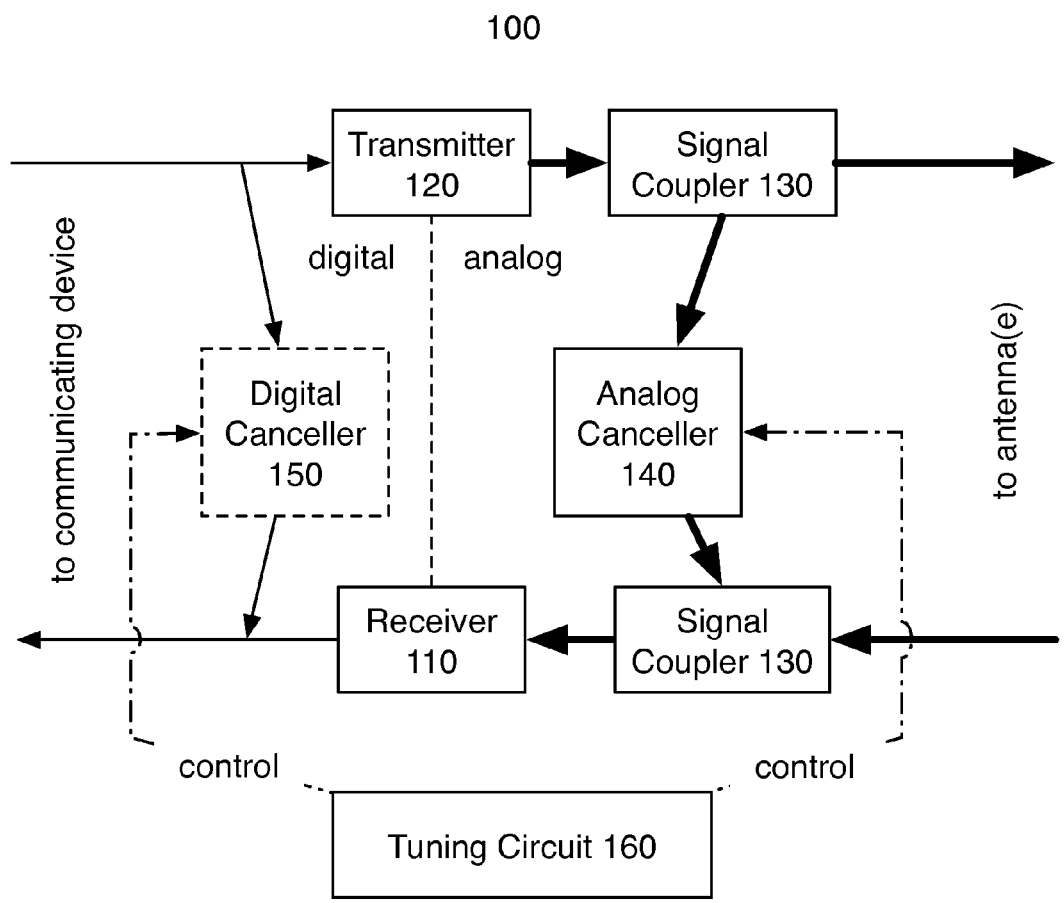
FIG. 2 is a schematic representation of a system of a preferred embodiment.

As shown in FIG. 2, a system 100 for self-interference canceller tuning includes a receiver 110, a transmitter 120, a signal coupler 130, an analog self-interference canceller 140, and a tuning circuit 160. The system may additionally or alternatively include a digital self-interference canceller 150.

The system 100 functions to increase the performance of full-duplex transceivers (or other applicable systems) via implementation of a multi-peak filters in the analog self-interference canceller 140.

The system 100 may perform self-interference cancellation by performing analog and/or digital self-interference cancellation based on any number of sampled analog and/or digital transmit signals. For example, the digital self-interference canceller 160 may sample a digital transmit signal, as shown in FIG. 2, but the digital self-interference canceller 160 may additionally or alternatively sample an analog transmit signal (e.g., through an ADC coupled to the analog transmit signal).

The system 100 preferably performs analog and digital self-interference cancellation simultaneously and in parallel, but may additionally or alternatively perform analog and/or digital self-interference cancellation at any suitable times and in any order.

The system 100 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 100 preferably includes memory to store configuration data, but may additionally or alternatively be configured using externally stored configuration data or in any suitable manner.

The receiver 110 functions to receive analog receive signals transmitted over a communications link (e.g., a wireless channel, a coaxial cable). The receiver 110 preferably converts analog receive signals into digital receive signals for processing by a communications system, but may additionally or alternatively not convert analog receive signals (passing them through directly without conversion).

The receiver 110 is preferably a radio-frequency (RF) receiver, but may additionally or alternatively be any suitable receiver.

The receiver 110 is preferably coupled to the communications link by a duplexer-coupled RF antenna, but may additionally or alternatively be coupled to the communications link in any suitable manner. Some examples of alternative couplings include coupling via one or more dedicated receive antennas. In another alternative coupling, the receiver 110 may be coupled to the communications link by a circulator-coupled RF antenna.

Figure 3:
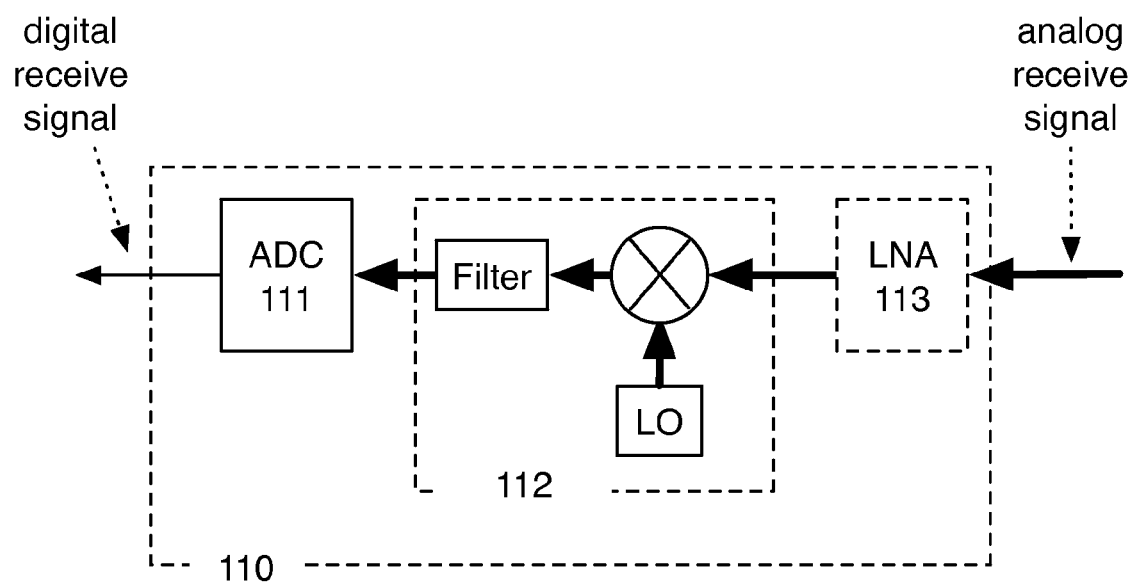
FIG. 3 is a schematic representation of a receiver of a system of a preferred embodiment.

The receiver 110 preferably includes an analog-to-digital converter (ADC) 111 and a frequency downconverter 112, as shown in FIG. 3. The receiver 110 may additionally include a low-noise amplifier 113. The receiver 110 may additionally or alternatively include amplifiers, filters, signal processors and/or any other suitable components. In one variation of a preferred embodiment, the receiver 110 includes only analog processing circuitry (e.g., amplifiers, filters, attenuators, delayers). The receiver may function to scale, shift, and/or otherwise modify the receive signal. The downconverter 112 functions to downconvert the analog receive signal from RF (or any other suitable frequency) to a baseband analog receive signal, and the analog-to-digital converter (ADC) 111 functions to convert the baseband analog receive signal to a digital receive signal.

The ADC 111 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

The frequency downconverter 112 functions to downconvert the carrier frequency of the analog receive signal to baseband, preparing it for conversion to a digital receive signal. The downconverter 112 preferably accomplishes signal downconversion using heterodyning methods, but may additionally or alternatively use any suitable upconversion methods.

The downconverter 112 preferably includes a local oscillator (LO), a mixer, and a baseband filter. The local oscillator functions to provide a frequency shift signal to the mixer; the mixer combines the frequency shift signal and the analog receive signal to create (usually two) frequency shifted signals, one of which is the baseband signal, and the baseband filter rejects signals other than the baseband analog receive signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, or any other suitable type of filter. The baseband filter is preferably a passive filter, but may additionally or alternatively be an active filter. The baseband filter is preferably implemented with analog circuit components, but may additionally or alternatively be digitally implemented.

The transmitter 120 functions to transmit signals of the communications system over a communications link to a second communications system. The transmitter 120 preferably converts digital transmit signals into analog transmit signals.

The transmitter 120 is preferably a radio-frequency (RF) transmitter, but may additionally or alternatively be any suitable transmitter.

The transmitter 120 is preferably coupled to the communications link by a duplexer-coupled RF antenna, but may additionally or alternatively be coupled to the communications link in any suitable manner. Some examples of alternative couplings include coupling via one or more dedicated transmit antennas. In another alternative coupling, the transmitter 120 may be coupled to the communications link by a duplexer-coupled RF antenna.

Figure 4:
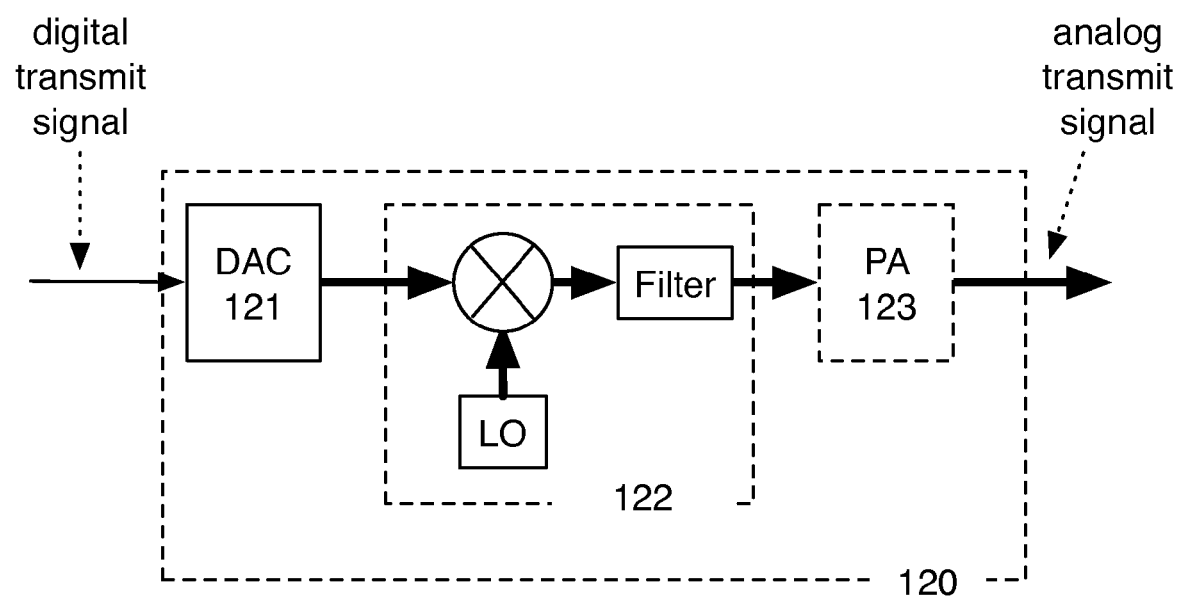
FIG. 4 is a schematic representation of a transmitter of a system of a preferred embodiment.

The transmitter 120 preferably includes a digital-to-analog converter (DAC) 121 and a frequency upconverter 122, as shown in FIG. 4. The transmitter 120 may additionally include a power amplifier 123. The transmitter 120 may additionally or alternatively include amplifiers, filters, signal processors and/or any other suitable components. The transmitter 120 may function to scale, shift, and/or otherwise modify the transmit signal. The digital-to-analog converter (DAC) 121 functions to convert the digital transmit signal to a baseband analog transmit signal, and the upconverter 122 functions to upconvert the baseband analog transmit signal from baseband to RF (or any other intended transmission frequency).

The DAC 121 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

The frequency upconverter 122 functions to upconvert the carrier frequency of the baseband analog transmit signal to a radio frequency, preparing it for transmission over the communications link. The upconverter 122 preferably accomplishes signal upconversion using heterodyning methods, but may additionally or alternatively use any suitable upconversion methods.

The upconverter 122 preferably includes a local oscillator (LO), a mixer, and an RF filter. The local oscillator functions to provide a frequency shift signal to the mixer; the mixer combines the frequency shift signal and the baseband analog transmit signal to create (usually two) frequency shifted signals, one of which is the RF analog transmit signal, and the RF filter rejects signals other than the RF analog transmit signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The RF filter is preferably a bandpass filter centered around a tunable radio frequency. Additionally or alternatively, the RF filter may be a bandpass filter centered around a set radio frequency, or any other suitable type of filter. The RF filter is preferably a passive filter, but may additionally or alternatively be an active filter. The RF filter is preferably implemented with analog circuit components, but may additionally or alternatively be digitally implemented.

Figure 5A:
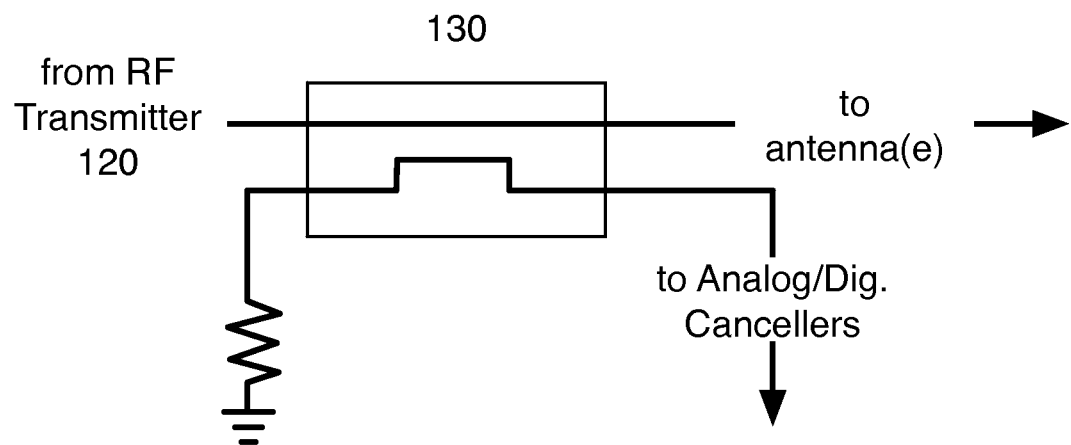
FIGS. 5A and 5B are schematic representations of signal couplers of a system of a preferred embodiment.
Figure 5B:
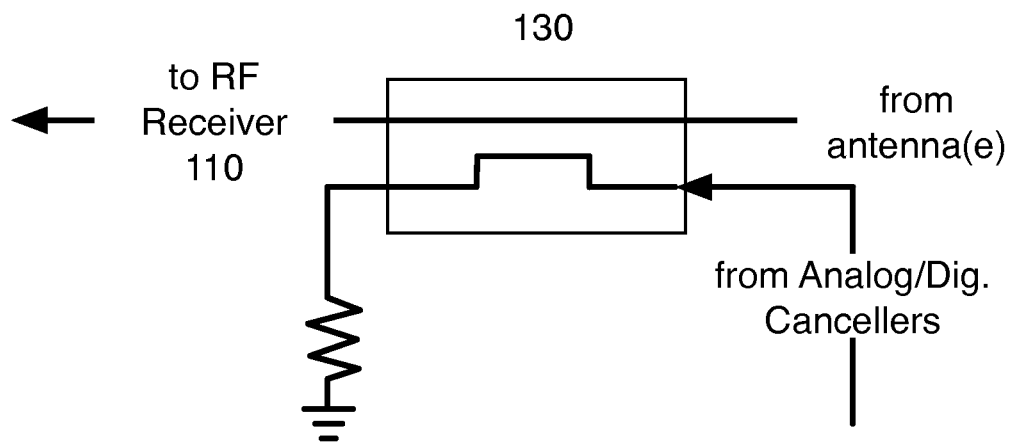

The signal coupler 130, as shown in FIGS. 5A and 5B, functions to allow signals to be split and/or joined. The signal coupler 130 may be used to provide a sample of the analog transmit signal for the analog canceller 140 and/or the digital canceller 160, as shown in FIG. 5A; that is, the signal coupler 130 may serve as a transmit coupler. The signal coupler 130 may also be used to combine one or more analog self-interference cancellation signals (from analog/digital cancellers) with the analog receive signal, as shown in FIG. 5B; that is, the signal coupler 130 may serve as a receive coupler. Additionally or alternatively, the signal coupler 130 may be used for any other purpose.

If the signal coupler 130 is used as a transmit coupler (which is assumed for the remainder of this paragraph), the signal coupler 130 is preferably directly coupled to the transmitter 120, but may additionally or alternatively be coupled indirectly to the transmitter 120 and/or be coupled to another suitable RF transmission source. The signal coupler 130 preferably has at least two outputs; one coupled to antenna(e) (directly or indirectly) and another coupled to one or more of the analog canceller 140 and the digital canceller 150. The signal coupler 130 preferably routes the majority of input power to the antenna(e) output port, but may additionally or alternatively route power in any suitable manner (e.g., routing the majority of power to other output ports). The signal coupler 130 may have any number of input and output ports, including bidirectional input/output ports.

If the signal coupler 130 is used as a receive coupler (which is assumed for the remainder of this paragraph), the receive coupler is preferably directly coupled to the receiver 110, but may additionally or alternatively be coupled indirectly to the receiver 110 and/or be coupled to another suitable RF receiver. The signal coupler 130 preferably has at least two inputs, one coupled to antenna(e) of the full-duplex radio (directly or indirectly) and another coupled to one or more of the analog canceller 140 and the digital canceller 150. The signal coupler 130 preferably couples the majority of power from both input ports to the receiver output port; this coupling preferably results in the receiver output port outputting a sum of one or more self-interference cancellation signals (generated by cancellers 140/150) and the RF receive signal (received at the antenna(e)). Additionally or alternatively, the signal coupler 130 may couple or route power in any suitable manner. The signal coupler 130 may have any number of input and output ports, including bidirectional input/output ports.

The signal coupler 130 is preferably a short section directional transmission line coupler, but may additionally or alternatively be any power divider, power combiner, directional coupler, or other type of signal splitter. The signal coupler 130 is preferably a passive coupler, but may additionally or alternatively be an active coupler (for instance, including power amplifiers). For example, the signal coupler 130 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the signal coupler 130 are preferably phase-shifted by ninety degrees, but may additionally or alternatively be in phase or phase shifted by a different amount (e.g., zero degrees, 180 degrees).

The system 100 preferably includes two signal couplers 130 (a transmit and a receive coupler); these signal couplers 130 preferably connect to a single antenna through a duplexer or circulator, but may additionally or alternatively connect to multiple antennae. In one example, the transmit coupler and receive coupler connect to two separate antennae (e.g., a transmit antenna and a receive antenna); in another example, the transmit coupler and receive coupler both connect to the same two antennae. The transmit coupler and receive coupler may additionally or alternatively connect to any suitable RF transmit and RF receive sources (e.g., an RF signal transmitted solely over coaxial cable). There may additionally or alternatively be filters, power amplifiers, and/or any other RF signal modifying components between the couplers 130 and antennae.

Figure 6:
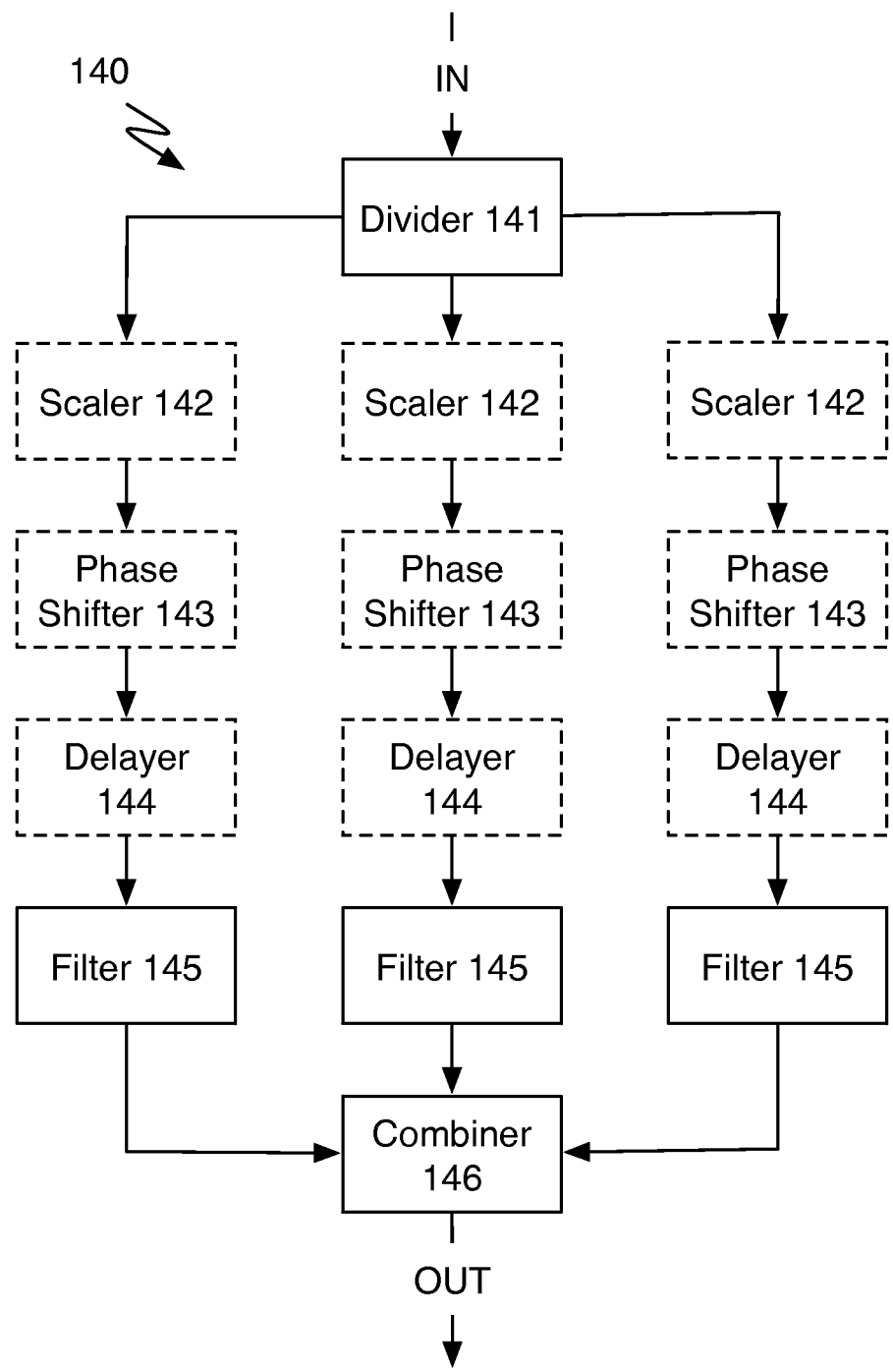
FIG. 6 is a schematic representation of an analog self-interference canceller of a system of a preferred embodiment.

The analog self-interference canceller 140, as shown in FIG. 6, functions to produce an analog self-interference cancellation signal from the analog transmit signal that can be combined with the analog receive signal to reduce self-interference present in the analog receive signal. The analog self-interference canceller 140 is preferably designed to operate at a single radio frequency (RF) band, but may additionally or alternatively be designed to operate at multiple RF bands, at one or multiple intermediate frequency (IF) bands, or at any suitable frequency band.

The analog self-interference canceller 140 is preferably implemented as an analog circuit that transforms an RF transmit signal into an analog self-interference cancellation signal by combining a set of filtered, scaled, and/or delayed versions of the RF transmit signal, but may additionally or alternatively be implemented as any suitable circuit. For instance, the analog self-interference canceller 140 may perform a transformation involving only a single version or copy of the RF transmit signal. The transformed signal (the analog self-interference cancellation signal) preferably represents at least a part of the self-interference component received at the receiver 110.

The analog self-interference canceller 140 is preferably adaptable to changing self-interference parameters in addition to changes in the analog transmit signal; for example, RF transceiver temperature, ambient temperature, antenna configuration, humidity, and RF transmitter power. Adaptation of the analog self-interference canceller 140 is preferably performed by the tuning circuit 160, but may additionally or alternatively be performed by a control circuit or other control mechanism included in the canceller 140 or any other suitable controller.

In one implementation of a preferred embodiment, the analog self-interference canceller 140 includes a signal divider 141, scalers 142, phase shifters 143, delayers 144, filters 145, and signal combiners 146, as shown in FIG. 6.

In this implementation, the analog self-interference canceller 140 splits the transmit signal using the divider 141, and transforms each signal path individually before recombining them at the signal combiner 146. The analog self-interference canceller 140 preferably transforms each signal path by scaling (with the scaler 142), phase shifting (with the phase shifter 143) and/or delaying (with the delayer 144) the signal paths, in addition to filtering each signal path with a filter 145. A plurality of the filters 145 are multi-peak filters, but filters 145 may additionally or alternatively be single-peak filters or any suitable filter.

In one implementation of the analog self-interference canceller 140, the filter 145 output is coupled to the scaler 142 input, the scaler 142 output is coupled to the phase shifter 143 input, and the phase shifter 143 output is coupled to the delayer 144 input. In another implementation of the analog self-interference canceller 140, the scaler 142 output is coupled to the phase shifter 143 input, and the phase shifter 143 output is coupled to the delayer 144 input, and the delayer 144 output is coupled to the filter 145 input. These two example implementations are a small subset of the total number of configurations possible for the analog self-interference canceller 140. The components of the analog self-interference canceller 140 may be coupled in any manner that enables analog self-interference cancellation for the system 100. In one implementation of the analog self-interference canceller 140, each signal path (i.e., each path associated with a different filter 145) includes all three of a scaler 142, a phase shifter 143, and a delayer 144; in an alternate implementation, signal paths may include any subset of a scaler 142, a phase shifter 143, and a delayer 144, or signal paths may included none of the set.

The signal divider 141 functions to split the transmit signal into multiple transmit signal paths, each preferably associated with a filter 145. Alternatively, some signal paths may not comprise a filter 145. The signal divider 141 preferably splits the transmit signal into multiple transmit signals having substantially the same waveform as the input transmit signal and equal power; the signal divider 141 may additionally or alternatively split the transmit signal into multiple transmit signals having different power levels and/or containing different waveforms than the input transmit signal. The signal divider 141 is preferably a transmission line power divider, but may additionally or alternatively be any suitable power divider, splitter, or coupler. The signal divider 141 may additionally contain any suitable electronics for pre-processing the transmit signal; for example, the signal divider 141 may contain an amplifier to increase the power contained in one or more of the output transmit signals.

The scalers 142 function to scale transmit signal components; specifically, the scalers 142 effectively multiply the transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. Scale factors may be complex; for example, a scale factor of $$e^{\frac{i\pi}{2}}$$

might be represented as a phase shift of ninety degrees. The scalers 142 provide the weighting for the combination of self-interference components at the signal combiner 146 (e.g., a signal with scale factor 2 is weighted twice as heavily as one with a scale factor of 1).

The scalers 142 may include attenuators, amplifiers, phase inverters, and/or any other suitable components for scaling transmit signal components. Attenuators may be resistive attenuators (T pad, Pi pad), amplifiers with less than unity gain, or any other suitable type of attenuator. Amplifiers may be transistor amplifiers, vacuum tube amplifiers, op-amps, or any other suitable type of amplifier. Phase inverters may be any phase inversion devices, including NPN/PNP phase inversion circuits and/or inverting amplifiers.

The scalers 142 preferably are capable of attenuation, gain, and phase inversion, but may alternatively be capable only of a subset of said capabilities. Each scaler 142 preferably includes all three capabilities in a single device (e.g., an amplifier with tunable gain and two outputs, one inverted and one non-inverted) but may additionally or alternatively separate capabilities into different sections (e.g., an amplifier with tunable gain but no inversion capability, along with a separate phase inversion circuit). The scalers 142 are preferably controlled by the tuning circuit 160, but may additionally or alternatively be controlled in any suitable manner. The tuning circuit 160 preferably controls scalers 142 by dynamically setting scale factors for each scaler 142, but may additionally or alternatively control scalers 142 in any suitable manner.

Each phase shifter 143 functions to shift the phase of a signal path of the analog self-interference canceller 140. Phase shifters 143 can allow the self-interference cancellation signal to reflect the contributions of multiple signal components with offset phases.

Each phase shifter 143 preferably includes an impedance matching network at its input and output that compensates for variations in the phase shifter 143 input and output impedance (and/or phase shift amount) due to changes in signal component frequency or simply transforms the impedance to and from a suitable impedance level for the core of the phase shifter to a standardized impedance level (50 ohms). Alternatively, the phase shifter 143 may not include impedance matching networks. The impedance matching networks are preferably tunable (e.g., continuously or discretely variable) but may additionally or alternatively be static (i.e., the impedance transformation achieved by using the network is not variable).

The phase shifter 143 is preferably separated into a set of phase shifting stages. These phase shifting stages preferably may be switched 'on' (e.g., in signal path) or 'off' (e.g., bypassed, out of signal path), depending on control signals. The resulting phase shift is determined by which stages are on and which stages are off; for example, a phase shifter 143 with a 900 degree phase shifting stage and a to degree phase shifting stage 'on' might cause a shift of 100 degrees in signal phase.

Each phase shifting stage preferably causes a set amount (i.e., non-variable amount) of phase shift. Alternatively, phase shifting stages may include tunable phase-shift elements. For example, a phase shifting stage may include a varactor; by changing a control voltage of the varactor, the varactor's capacitance (and thus the amount of phase shift experienced by a signal passing through the stage) may be varied.

The phase shifters 143 are preferably controlled by the tuning circuit 160, but may additionally or alternatively be controlled in any suitable manner. The tuning circuit 160 preferably controls scalers 143 by dynamically setting phase shifts for each scaler 142, but may additionally or alternatively control scalers 142 in any suitable manner.

The delayers 144 function to delay transmit signal components, preferably to match corresponding delays in received self-interference. The delay introduced by each delayer 144 (also referred to as a delayer delay) is preferably fixed (i.e., the delayer 144 is a fixed delayer), but delayers 144 may additionally or alternatively introduce variable delays. The delayer 144 is preferably implemented as an analog delay circuit (e.g., a bucket-brigade device, a long transmission line, a series of RC networks) but may additionally or alternatively be implemented in any other suitable manner. If the delayer 144 is a variable delayer, the delay introduced is preferably set by the tuning circuit 160, but may additionally or alternatively be set in any suitable manner.

After transformation by a scaler 142, phase shifter 143, and/or a delayer 144 and filtering by a filter 145, transmit signal components are transformed into self-interference cancellation signal components, which may be combined to form an self-interference cancellation signal.

Note that any of the functions of the scaler 142, phase shifter 143, and delayer 144 may be performed by a combined circuit (e.g., the scaler 142 and phase shifter 143 may be integrated into a single circuit). Also note that while the scaler 142, phase shifter 143, and delayer 144 are shown within individual signal paths (i.e., between divider 141 and combiner 146) these components may additionally or alternatively be placed before the divider 141 or after the combiner 146; this is discussed in greater detail later in the present application.

Each filter 145 functions to transform transmit signal components according to the response of the filter, which may introduce a change in signal magnitude, signal phase, and/or signal delay. The filters 145 preferably work in combination to create a set of signal components that may be weighted (using scalers 142, phase shifters 143, and/or delayers 144) to form a self-interference cancellation signal (i.e., a basis set). The filters 145 may additionally be used to introduce delays to signal components passing through the filters 145. Depending on the bandwidth and structure of the filter 145, as well as the signal passing through the filter 145, one of these effects may be dominant; e.g., some signals may experience a significant change in magnitude (across frequency) without a significant time delay, while other signals may experience time delay without a significant change in magnitude. Alternatively, the filter 145 may produce both significant time delay and magnitude change for a given signal.

The filters 145 are preferably multi-peak bandpass filters formed from a combination (e.g., in series and/or in parallel) of resonant elements. Resonant elements of the filters 145 are preferably formed by lumped elements, but may additionally or alternatively be distributed element resonators, ceramic resonators, SAW resonators, crystal resonators, cavity resonators, or any suitable resonators.

The filters 145 are preferably tunable such that one or more peaks of the filter 145 may be shifted. In one implementation of a preferred embodiment, one or more resonant elements of the filter 145 may include a variable shunt capacitance (e.g., a varactor or a digitally tunable capacitor) that enables filter peaks to be shifted. Additionally or alternatively, filters 145 may be tunable by quality factor (i.e., Q may be modified by altering circuit control values), or filters 145 may be not tunable.

Filters 145 may include, in addition to resonant elements, delayers, phase shifters, and/or scaling elements.

The filters 145 are preferably passive filters, but may additionally or alternatively be active filters. The filters 145 are preferably implemented with analog circuit components, but may additionally or alternatively be digitally implemented. The center frequency of any tunable peak of a filter 145 is preferably controlled by the tuning circuit 160, but may additionally or alternatively be controlled by any suitable system (including manually controlled, e.g. as in a mechanically tuned capacitor).

The filters 145 preferably form a basis set for a desired or predicted transformation function; that is, the spectral properties of filters 145 are preferably configured such that the number of signal paths required to produce a self-interference cancellation signal from a given analog transmit signal is reduced compared to a combination of simple (e.g., single peak) bandpass filters.

Figure 7:
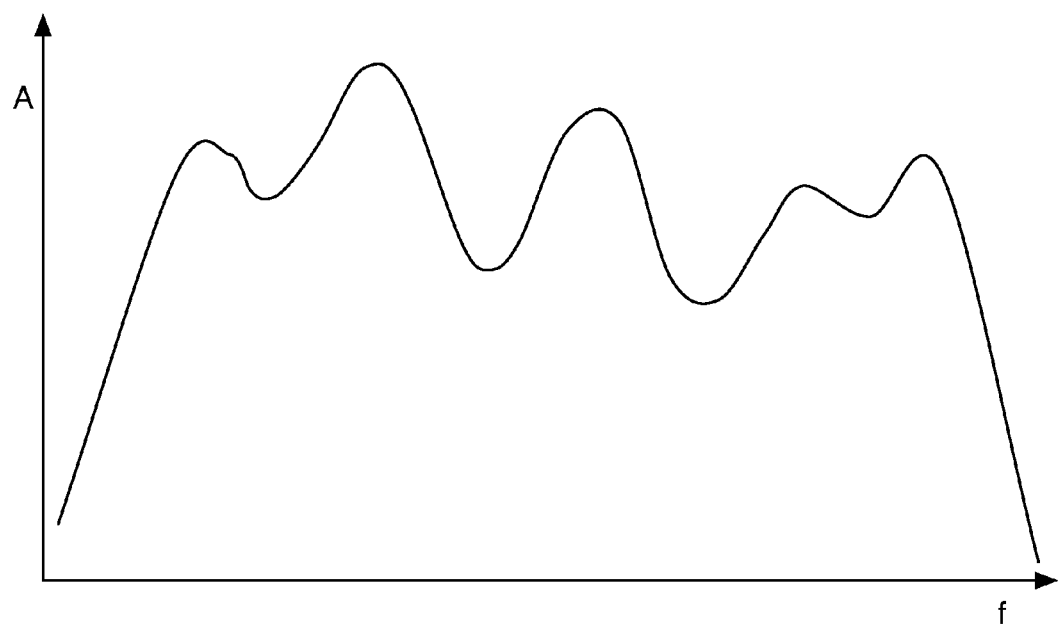
FIG. 7 is an example view of a desired self-interference canceller frequency response.
Figure 8A:
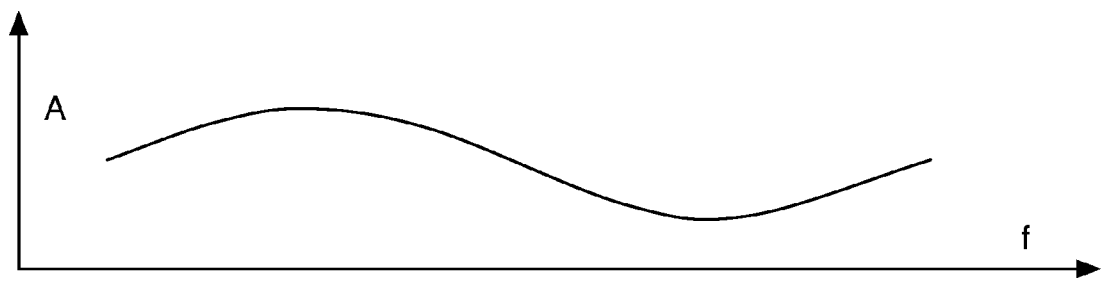
FIGS. 8A, 8B, and 8C are example views of frequency responses of a set of basis filters of a system of a preferred embodiment.
Figure 8B:
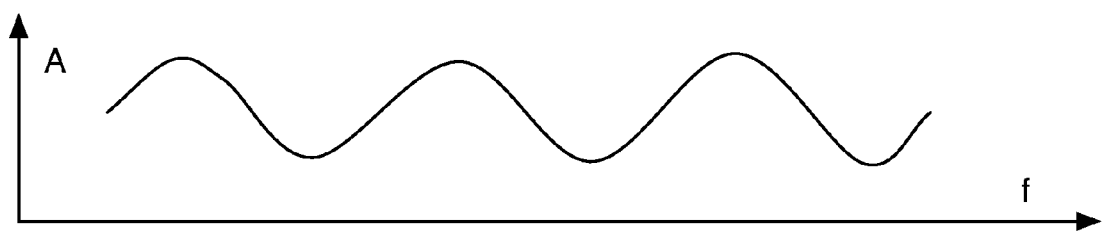
Figure 8C:
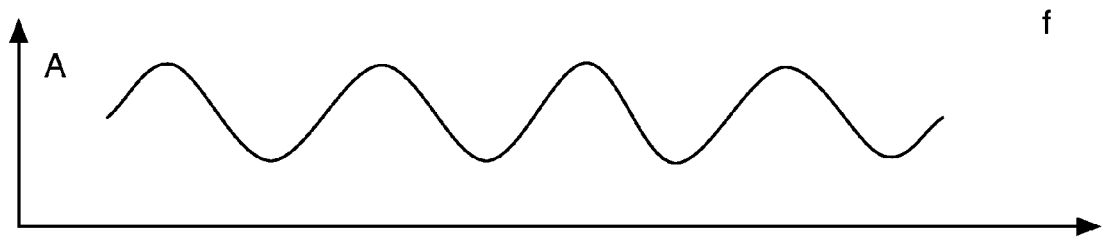

For example, take a desired filter response as shown in FIG. 7. If the filters 145 are limited to only a few types of simple bandpass filters, it may take a great number of filters to reproduce the filter response of FIG. 7. By using filters specifically designed to form a basis set for a particular transformation, a much smaller number of filters may be used. For example, the response of FIG. 7 may be reproduced using a linear combination of only three filters as shown in FIGS. 8A, 8B, and 8C. Note that a basis set of filter responses may include one or more un-filtered signal components (e.g., one or more of the signal paths between the divider 141 and the combiner 146 have no filter 145).

Figure 9:
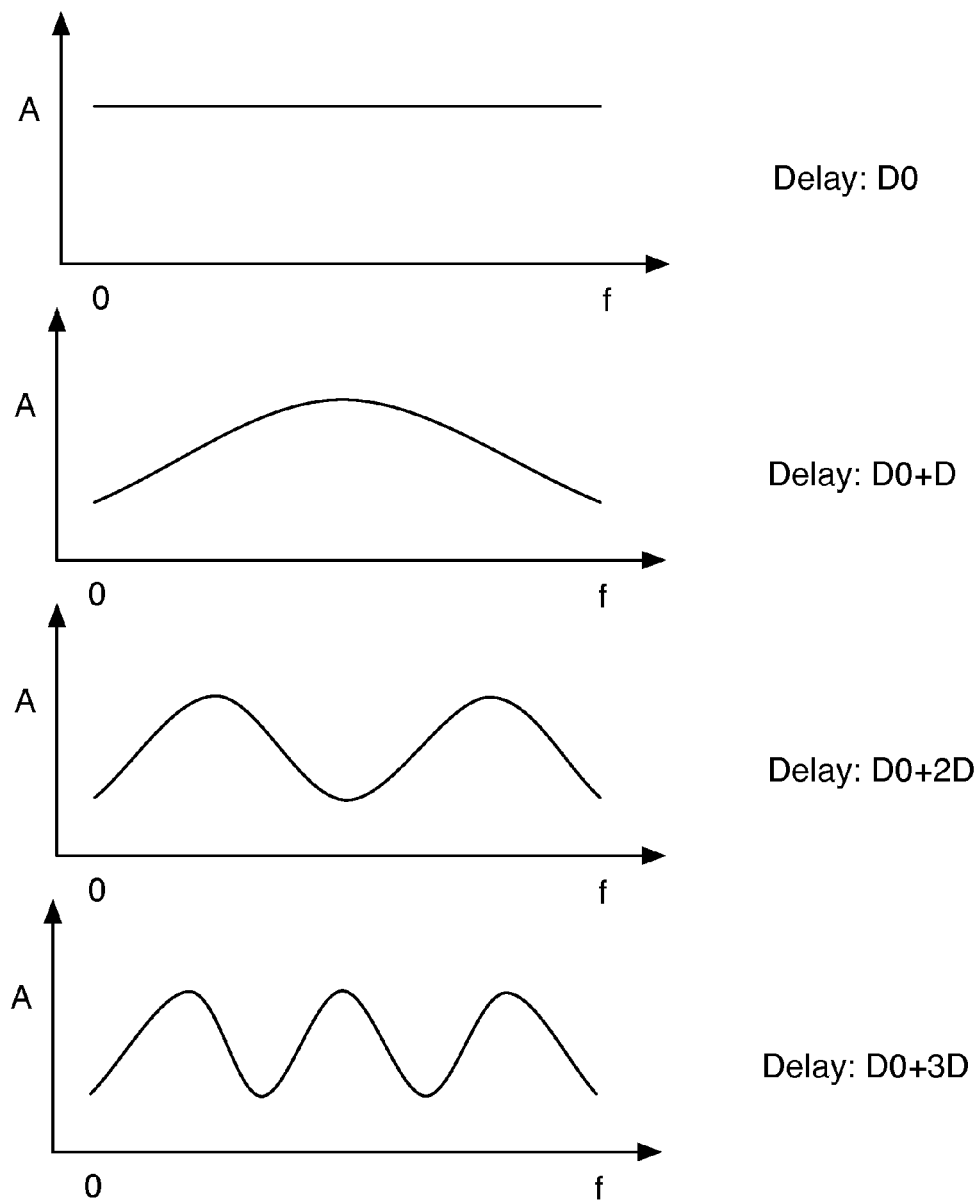
FIG. 9 is an example view of frequency responses and time delays of a set of basis filters of a system of a preferred embodiment.

In one implementation, a set of filters 145 is configured to have a single-peak filter and a plurality of multi-peak filters, such that all filters 145 of the set operate on the same frequency band (i.e., the outermost edges of all filters appear at roughly the same frequencies), but the frequencies are subdivided by an integer number of filter peaks, as shown in FIG. 9. For example, the operable bandwidth may be defined from o to f. The single peak-filter is centered at f/2, while the two-peak filter has peaks centered at f/4 and 3f/4, the three peak filter has peaks centered at f/6, f/2, and 5f/6.

Note that the frequency relationship between the single-peak and two-peak filter may be alternatively stated as: the single-peak filter has a peak centered at a first frequency; wherein the two-peak filter has exactly two peaks centered at a second frequency and a third frequency respectively; the first frequency is twice the second frequency; the third frequency is three times the second frequency. Likewise, the three-peak filter (with peaks at fourth, fifth, and sixth frequencies) may be related as follows: the first frequency is three times the fourth frequency, the fifth frequency is three times the fourth frequency (i.e., is the same as the first frequency), and the sixth frequency is five times the fourth frequency.

In general, the center frequencies of an n-peak filter may be defined as $$f_{n,i} = \frac{f}{2n} + i\frac{f}{n}, i \to \{0, n-1\}$$

Such filters 145 may be configured to have related time delays associated with the filters 145; for example, if a single peak filter has a delay $D_0+D$ for frequencies of the frequency band (in the previous example, between o and f), a two peak filter may be configured to have a delay of $D_0+2D$; an n-peak filter may be configured to have a delay of $D_0+ND$. In such a configuration, an unfiltered path may be configured to have a delay of $D_0$.

Note that this delay relationship may be stated as: the difference between the delay of a single peak filter and an unfiltered path is equal to the difference between the delay of a two peak filter and a single peak filter (i.e., $(D_0+D)-D_0=(D_0+2D)-(D_0+D)=D$).

Figure 10:
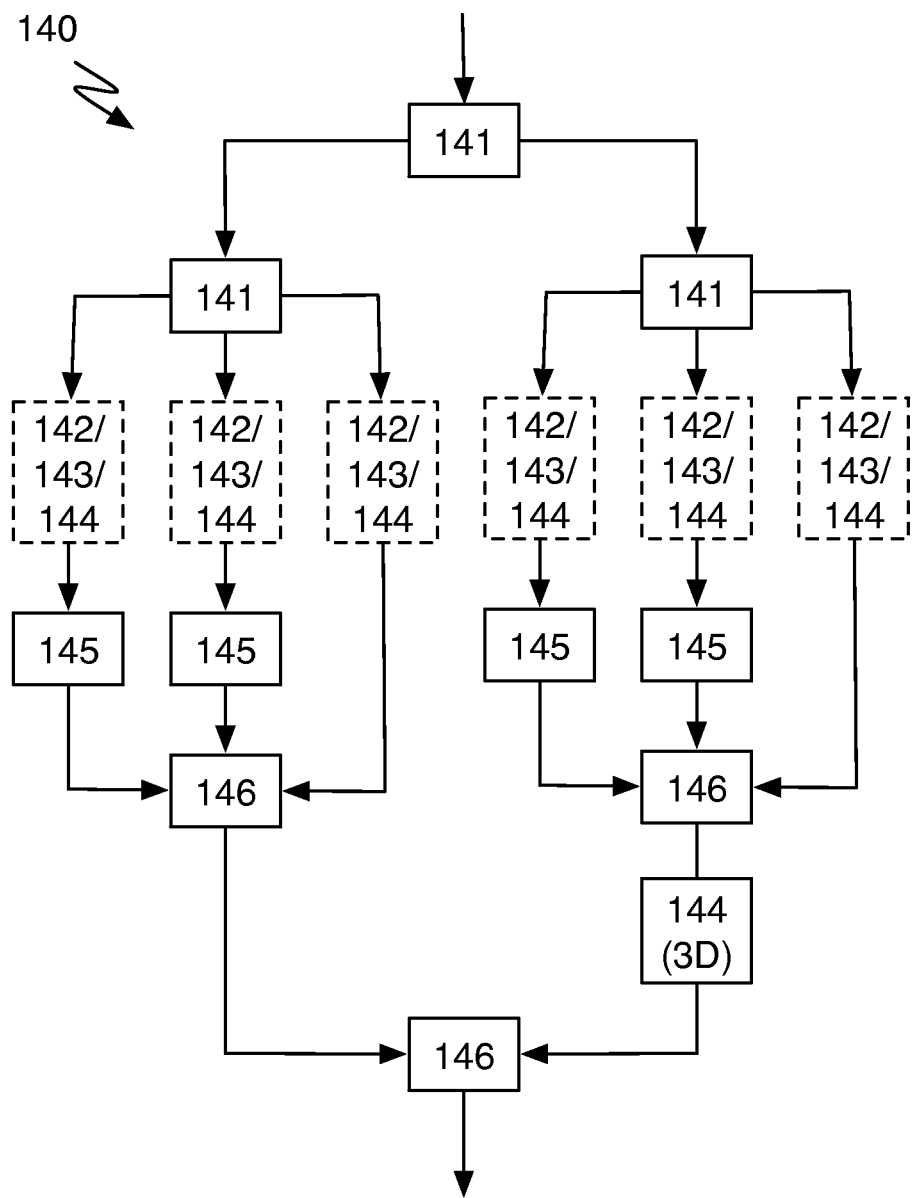
FIG. 10 is a schematic representation of an analog self-interference canceller of a system of a preferred embodiment.

Basis sets of filters as described above may be grouped and paired with static delayers 144 to create larger sets of potential delays. For example, one basis set of two filters 144 (and one unfiltered path) may be combined with the same basis set with the addition of a single delayer 144 having a delay of 3D to create a set of six signal components with delays $\{D_0, D_0+D, D_0+2D, D_0+3D, D_0+4D, D_0+5D\}$, as shown in FIG. 10. Note that this is an arithmetic sequence of delays.

Note that other components of the self-interference canceller 140 may be configured to account for magnitude changes or time delay incurred by filters 145. For example, a scaler 142 may be configured to amplify a signal to counteract signal attenuation incurred by passing through the filter 145. As another example, a scaler 142 may be configured to attenuate a signal on a first signal path to match signal attenuation incurred by a signal passing through a filter on a second signal path.

The signal combiner 146 functions to combine the self-interference cancellation signal components into an analog self-interference cancellation signal; the analog self-interference cancellation signal may then be combined with an analog receive signal to remove self-interference. The signal combiner 146 preferably combines self-interference cancellation signal components (resulting from multiple signal paths) and outputs the resulting analog self-interference cancellation signal. The signal combiner 146 is preferably a transmission line coupler, but may additionally or alternatively be any suitable type of coupler (described in the signal coupler 130 sections). The signal combiner 146 may additionally contain any suitable electronics for post-processing the self-interference cancellation signal before outputting it; for example, the signal combiner 146 may contain an amplifier to increase the power of the self-interference cancellation signal.

Note that the self-interference canceller 140 may include multiple signal dividers 141 and/or combiners 146, as shown in FIG. 10.

As previously mentioned, the analog self-interference canceller 140 may perform self-interference cancellation at either or both of IF or RF bands. If the analog self-interference canceller 140 performs cancellation at IF bands, the analog self-interference canceller 140 preferably includes downconverters and upconverters (substantially similar to the downconverter 112 and upconverter 122 respectively).

In a variation of a preferred embodiment, the system 100 may include multiple analog self-interference cancellers operating in different frequency bands.

The digital self-interference canceller 150 functions to produce a digital self-interference cancellation signal from a digital transmit signal. The digital self-interference cancellation signal is preferably converted to an analog self-interference cancellation signal (by a DAC) and combined with the analog self-interference cancellation signals to further reduce self-interference present in the RF receive signal at the receiver 110. Additionally or alternatively, the digital self-interference cancellation signal may be combined with a digital receive signal.

The digital self-interference canceller 150 preferably samples the RF transmit signal of the transmitter 120 using an ADC (additionally or alternatively, the canceller 150 may sample the digital transmit signal or any other suitable transmit signal) and transforms the sampled and converted RF transmit signal to a digital self-interference signal based on a digital transform configuration. The digital transform configuration preferably includes settings that dictate how the digital self-interference canceller 150 transforms the digital transmit signal to a digital self-interference signal (e.g. coefficients of a generalized memory polynomial used to transform the transmit signal to a self-interference signal).

The digital self-interference canceller 150 may be implemented using a general-purpose processor, a digital signal processor, an application specific integrated circuit (ASIC), a field programmable gate array (FPGA) and/or any suitable processor(s) or circuit(s). The digital self-interference canceller 150 preferably includes memory to store configuration data, but may additionally or alternatively be configured using externally stored configuration data or in any suitable manner. In one implementation, the digital self-interference canceller 150 is substantially similar to the digital self-interference canceller of U.S. patent application Ser. No. 14/456,320, filed 11 Aug. 2014, which is incorporated in its entirety by this reference.

The digital self-interference canceller 150 may couple to transmit and receive signals in a number of ways. For example, the digital self-interference canceller 150 may use a converted RF transmit signal as input as well as provide a converted digital self-interference cancellation signal as output. As another example, the digital self-interference canceller 150 may use the digital transmit signal as input as a well as provide a digital self-interference cancellation signal as output (directly to the digital receive signal). The digital self-interference canceller may additionally or alternatively couple to transmit signals in any combination of digital and analog receive signals.

Note that while these examples reference the RF transmit signal and RF receive signal, the digital self-interference canceller 150 may additionally or alternatively couple to IF transmit signals and/or IF self-interference cancellation signals.

The tuning circuit 160 functions to control the configuration parameters of the analog canceller 140. The tuning circuit 160 may additionally or alternatively provide input to or control configuration parameters of the digital canceller 150. Configuration parameters may include pre-processing settings (at signal dividers 141), filter center frequency and/or Q factor (at filters 145), scale factor (at the scalers 142), phase change (at the phase shifters 143), delay (at the delayers 144), post-processing settings (at the signal combiner 146) and/or any other suitable configuration parameters. The tuning circuit 160 preferably controls filter 145 center frequencies, scaler 142 scale factors (including gain/attenuation/phase inversion), phase shifter 143 phase shifts, and delayer 144 delays to create RF and/or IF self-interference cancellation signals that reflect some or all of the self-interference contained within received signals.

The tuning circuit 160 preferably sets the configuration state of the analog canceller 140 (where the state includes settings for each variable setting controlled by the tuning circuit 160) based upon the received RF/IF transmit signals, but may additionally or alternatively set the configuration state based on any other suitable input. Suitable input may include signal data (e.g. IF transmit signal, digital transmit signal, RF receive signal), full-duplex radio settings (e.g. RF transmitter power, antenna position), full-duplex radio characteristics (e.g. receiver operating characteristics, transmitter operating characteristics), environmental data (e.g., transceiver temperature, ambient temperature, ambient humidity), and/or any other input relating to self-interference present in the receive signal.

The tuning circuit 160 preferably sets configuration states based on an algorithm responsive to input. This may include a state-choosing algorithm that selects from a set of pre-chosen states based on some input parameter set, a dynamic algorithm that generates states based on the input parameter set (as opposed to choosing from a limited state set), or any other suitable algorithm. Additionally or alternatively, the tuning circuit 160 may set configuration states in any suitable manner.

The tuning circuit 160 may adapt configuration states and/or configuration state generating/choosing algorithms using analytical methods, online gradient-descent methods (e.g., LMS, RLMS), and/or any other suitable methods. The tuning circuit 160 may additionally or alternatively adapt configuration states and/or configuration state generating/choosing algorithms based on test input scenarios (e.g. scenarios when the signal received by the receiver 110 is known), scenarios where there is no input (e.g. the only signal received at the receiver 110 is the signal transmitted by the transmitter 120), or scenarios where the received signal is unknown. In cases where the received signal is an unknown signal, the tuning circuit 160 may perform adaptation based on historical received data (e.g. what the signal looked like ten seconds in the past) or any other suitable information. The tuning circuit 160 may additionally or alternatively perform adaptation based on the content of RF and/or IF transmit signals; for instance, if the RF transmit signal is modulated in a particular way, the tuning circuit may perform adaptation such that when the RF self-interference signal is combined with the RF receive signal the detected modulation (as an indicator of self-interference) is reduced.

The tuning circuit 160 is preferably implemented as a programmable digital circuit, but may additionally or alternatively be implemented in any suitable digital or analog circuit, including implementation as software in a general purpose computing device.

Though the cancellers 140/150 are preferably coupled to signal couplers 130 located after transmitter 120 outputs and before receiver 110 inputs, the cancellers 140/150 may additionally or alternatively be coupled to intermediate outputs and/or inputs (e.g., an output before the transmitter 120 output or an input after the receiver 110 input).

As a person skilled in the art will recognize from the previous detailed description and from the figures and claims, modifications and changes can be made to the preferred embodiments of the invention without departing from the scope of this invention defined in the following claims.

We claim:

1. A system for multi-peak filter-based analog self-interference cancellation comprising:
    a transmit coupler, communicatively coupled to an analog transmit signal of a communication system, that samples the analog transmit signal to create a sampled analog transmit signal;
    an analog self-interference canceller, comprising a first signal divider, first and second filters, first, second, and third scalers, and a first signal combiner, wherein the first signal divider splits the analog transmit signal into first, second, and third signal paths; wherein the first filter filters the first signal path and the first scaler scales the first signal path to create a first analog self-interference signal component; wherein the second filter filters the second signal path and the second scaler scales the second signal path to create a second analog self-interference signal component; wherein the third signal path is unfiltered and the third scaler scales the third signal path to create a third analog self-interference signal component; wherein the first filter has a single peak centered at a first frequency; wherein the second filter has exactly two peaks centered at a second frequency and a third frequency respectively; wherein the first frequency is twice the second frequency; wherein the third frequency is three times the second frequency; wherein the first signal combiner combines the first, second, and third analog self-interference signal components to form a first analog self-interference cancellation signal;
    a receive coupler, communicatively coupled to an analog receive signal of the communication system, that combines the first analog self-interference cancellation signal with the analog receive signal.

2. The system of claim 1, wherein the first and second filters are resonant element filters; wherein the second filter comprises two resonant elements in parallel.

3. The system of claim 2, wherein the first and second filters are lumped element resonant element filters.

4. The system of claim 3, wherein the first and second filters each include a tunable shunt capacitor; wherein the shunt capacitor is a varactor; wherein parameters of the varactor are controlled by a tuning circuit in response to received complex weights.

5. The system of claim 3, wherein the first and second filters each include a tunable shunt capacitor; wherein the shunt capacitor is a digitally tunable capacitor; wherein parameters of the digitally tunable capacitor are controlled by a tuning circuit in response to received complex weights.

6. The system of claim 1, wherein outer edges of passbands of the first filter and the second filter are at same frequencies.

7. The system of claim 1, wherein the first signal path, associated with the first filter having a single peak, is configured to have a first delay; wherein the second signal path, associated with the second filter having two peaks, is configured to have a second delay; wherein the third signal path, associated with no filter, is configured to have a third delay; wherein a difference between the first delay and the third delay is equal to a difference between the second delay and the first delay.

8. The system of claim 7, wherein the analog self-interference canceller further comprises a second signal divider, third and fourth filters, fourth, fifth, and sixth scalers, a second signal combiner, wherein the second signal divider splits the analog transmit signal into fourth, fifth, and sixth signal paths; wherein the third filter filters the fourth signal path and the fourth scaler scales the fourth signal path to create a fourth analog self-interference signal component; wherein the fourth filter filters the fifth signal path and the fifth scaler scales the fifth signal path to create a fifth analog self-interference signal component; wherein the sixth signal path is unfiltered and the sixth scaler scales the sixth signal path to create a sixth analog self-interference signal component; wherein the third filter has a single peak centered at the first frequency; wherein the fourth filter has exactly two peaks centered at the second frequency and the third frequency respectively; wherein the second signal combiner combines the fourth, fifth, and sixth analog self-interference signal components to form a second analog self-interference cancellation signal; wherein the receive coupler combines the first analog self-interference cancellation signal and the second analog self-interference cancellation signal with the analog receive signal.

9. The system of claim 8, wherein the fourth signal path, associated with the third filter having a single peak, is configured to have the first delay; wherein the fifth signal path, associated with the fourth filter having two peaks, is configured to have the second delay; wherein the sixth signal path, associated with no filter, is configured to have the third delay.

10. The system of claim 9, wherein the analog self-interference canceller further comprises a delayer, coupled to the second signal combiner, that delays the second analog self-interference cancellation signal.

11. The system of claim 10, wherein the delayer delays the second analog self-interference cancellation signal by a post-combination delay; wherein the post-combination delay is equal to three times the difference between the first delay and the third delay, wherein addition of the post-combination delay results in formation of an arithmetic series of delays by the first, second, third, fourth, fifth, and sixth signal paths.

12. The system of claim 11, wherein outer edges of passbands of the first, second, third, and fourth filters are at same frequencies.

13. The system of claim 11, wherein the first scaler compensates for magnitude changes to the first signal path due to filtering by the first filter; wherein the second scaler compensates for magnitude changes to the second signal path due to filtering by the second filter; wherein the fourth scaler compensates for magnitude changes to the fourth signal path due to filtering by the third filter; wherein the fifth scaler compensates for magnitude changes to the fifth signal path due to filtering by the fourth filter.

14. The system of claim 8, wherein the first, second, third, and fourth filters are resonant element filters; wherein the second and fourth filter comprise two resonant elements in parallel.

15. The system of claim 14, wherein the first and third filters each include a tunable shunt capacitor; wherein the second and fourth filters each include two tunable shunt capacitors; wherein the shunt capacitor is a varactor; wherein parameters of the varactor are controlled by a tuning circuit in response to received complex weights.

16. The system of claim 14, wherein the first and third filters each include a tunable shunt capacitor; wherein the second and fourth filters each include two tunable shunt capacitors; wherein the shunt capacitor is a digitally tunable capacitor; wherein parameters of the digitally tunable capacitor are controlled by a tuning circuit in response to received complex weights.

17. The system of claim 8, wherein outer edges of passbands of the first, second, third, and fourth filters are at same frequencies.

18. The system of claim 8, wherein the first scaler compensates for magnitude changes to the first signal path due to filtering by the first filter; wherein the second scaler compensates for magnitude changes to the second signal path due to filtering by the second filter; wherein the fourth scaler compensates for magnitude changes to the fourth signal path due to filtering by the third filter; wherein the fifth scaler compensates for magnitude changes to the fifth signal path due to filtering by the fourth filter.

19. The system of claim 1, wherein the first scaler compensates for magnitude changes to the first signal path due to filtering by the first filter; wherein the second scaler compensates for magnitude changes to the second signal path due to filtering by the second filter.

20. A system for multi-peak filter-based analog self-interference cancellation comprising:
a transmit coupler, communicatively coupled to an analog transmit signal of a communication system, that samples the analog transmit signal to create a sampled analog transmit signal;
an analog self-interference canceller, comprising a first signal divider, first and second filters, first, second, and third scalers, and a first signal combiner, wherein the first signal divider splits the analog transmit signal into first, second, and third signal paths; wherein the first filter filters the first signal path and the first scaler scales the first signal path to create a first analog self-interference signal component; wherein the second filter filters the second signal path and the second scaler scales the second signal path to create a second analog self-interference signal component; wherein the third signal path is unfiltered and the third scaler scales the third signal path to create a third analog self-interference signal component; wherein the first filter has a single peak centered at a first frequency; wherein the second filter has exactly two peaks centered at a second frequency and a third frequency respectively; wherein the first signal combiner combines the first, second, and third analog self-interference signal components to form a first analog self-interference cancellation signal;

a receive coupler, communicatively coupled to an analog receive signal of the communication system, that combines the first analog self-interference cancellation signal with the analog receive signal.

21. The system of claim 20, wherein the first and second filters are resonant element filters; wherein the second filter comprises two resonant elements in parallel.

22. The system of claim 20, wherein outer edges of passbands of the first filter and the second filter are at same frequencies.

23. The system of claim 20, wherein the first signal path, associated with the first filter having a single peak, is configured to have a first delay; wherein the second signal path, associated with the second filter having two peaks, is configured to have a second delay; wherein the third signal path, associated with no filter, is configured to have a third delay; wherein a difference between the first delay and the third delay is equal to a difference between the second delay and the first delay.

* * * * *